US012807107B2

(12) United States Patent
Horiguchi et al.

(10) Patent No.: US 12,807,107 B2
(45) Date of Patent: Nov. 24, 2026

(54) SURROUNDINGS MONITORING APPARATUS

(71) Applicant: SUBARU CORPORATION, Tokyo (JP)

(72) Inventors: Harunobu Horiguchi, Tokyo (JP); Junichi Sato, Tokyo (JP); Shigeki Ogawa, Tokyo (JP); Yuusuke Sakata, Tokyo (JP); Takahito Isobe, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 21 days.

(21) Appl. No.: 19/075,959

(22) Filed: Mar. 11, 2025

(65) Prior Publication Data

US 2025/0319851 A1 Oct. 16, 2025

(30) Foreign Application Priority Data

Apr. 10, 2024 (JP) ................................ 2024-063456

(51) Int. Cl.

*B60T 8/1755* (2006.01)
*B60T 7/12* (2006.01)
*B60W 50/14* (2020.01)
*H04W 4/029* (2018.01)
*H04W 4/40* (2018.01)

(52) U.S. Cl.

CPC .......... *B60T 8/17558* (2013.01); *B60T 7/122* (2013.01); *B60W 50/14* (2013.01); *H04W 4/029* (2018.02); *H04W 4/40* (2018.02)

(58) Field of Classification Search

CPC .... B60T 8/17558; B60T 7/122; B60W 50/14; H04W 4/029; H04W 4/40

USPC .......................................................... 701/301

See application file for complete search history.

(56) References Cited

U.S. PATENT DOCUMENTS 5,598,164 A * 1/1997 Reppas ................ G01S 13/931 342/72
9,734,714 B1 * 8/2017 Fan .................. G08G 1/096791
9,969,405 B2 * 5/2018 Otake ................... B60W 50/14
11,590,963 B2 * 2/2023 Chu ...................... B60W 30/06
2005/0073438 A1 * 4/2005 Rodgers ................. G08G 1/161 340/944

(Continued)

FOREIGN PATENT DOCUMENTS

JP 2014-85869 A 5/2014

*Primary Examiner* — Tuan C To
*Assistant Examiner* — Dominick Mulder
(74) *Attorney, Agent, or Firm* — Rimon P.C.

(57) ABSTRACT

A surroundings monitoring apparatus for a vehicle includes a communicator and a processor. The communicator is configured to receive position data of the device outputted from the device. The processor is configured to: detect the device that has entered an area less than a predetermined distance from the vehicle, and determine, when the device is moving, a prediction position that is a predicted position of the device after an elapse of a predetermined period of time; restrict, when a detection position of the device detected by the processor or the prediction position of the device is in front of the vehicle in the area, forward traveling of the vehicle; and restrict, when the detection position or the prediction position of the device is in rear of the vehicle in the area, rear traveling of the vehicle.

7 Claims, 6 Drawing Sheets

(56) References Cited

U.S. PATENT DOCUMENTS

| | | | | |
|---|---|---|---|---|
| 2005/0279551 | A1* | 12/2005 | LoPresti | G01S 17/931 180/167 |
| 2009/0000196 | A1* | 1/2009 | Kollar | E05F 15/43 49/28 |
| 2010/0023234 | A1* | 1/2010 | Kameyama | B60W 30/08 701/1 |
| 2011/0105097 | A1* | 5/2011 | Tadayon | H04M 3/53 455/418 |
| 2013/0282267 | A1* | 10/2013 | Rubin | G01C 21/26 701/301 |
| 2014/0045531 | A1* | 2/2014 | Kessoku | H04W 4/021 455/456.2 |
| 2015/0141043 | A1* | 5/2015 | Abramson | G01C 21/34 455/456.1 |
| 2016/0140843 | A1* | 5/2016 | Tosa | H04W 4/40 340/989 |
| 2017/0243485 | A1* | 8/2017 | Rubin | H04W 4/46 |
| 2017/0265044 | A1* | 9/2017 | Lundsgaard | H04W 4/48 |
| 2017/0342750 | A1* | 11/2017 | Hiramine | G07C 9/00309 |
| 2019/0258238 | A1* | 8/2019 | Lavoie | G05D 1/0033 |
| 2019/0351896 | A1* | 11/2019 | Solmaz | B60W 30/09 |
| 2020/0160714 | A1* | 5/2020 | Inaba | B60K 35/10 |
| 2020/0300025 | A1* | 9/2020 | Suzuki | E05C 17/006 |
| 2023/0278570 | A1* | 9/2023 | Kobel | E05F 1/002 |
| 2025/0282390 | A1* | 9/2025 | Cieslar | B60W 60/0025 |

* cited by examiner

SURROUNDINGS MONITORING APPARATUS

CROSS-REFERENCE TO RELATED APPLICATIONS

The present application claims priority from Japanese Patent Application No. 2024-063456 filed on Apr. 10, 2024, the entire contents of which are hereby incorporated by reference.

BACKGROUND

The disclosure relates to a surroundings monitoring apparatus for a vehicle.

Various techniques have been proposed that prevent a contact or a collision between a vehicle and a moving object such as another vehicle or a pedestrian when the moving object approaches the vehicle. For example, Japanese Unexamined Patent Application Publication No 2014-85869 discloses a rear monitoring apparatus for a vehicle which provides information to a driver of another vehicle by displaying an entry prohibition area on a road surface of the another vehicle or by controlling a speaker, when: the another vehicle approaches from a rear side of the vehicle in a parked state or a stopped state; and an opening operation of a door of the another vehicle is detected.

SUMMARY

An aspect of the disclosure provides a surroundings monitoring apparatus for a vehicle. The surroundings monitoring apparatus is configured to monitor surroundings of the vehicle, based on data acquired from a device that is portable and that is configured to communicate with the vehicle. The surroundings monitoring apparatus includes a communicator and a processor. The communicator is configured to receive position data of the device outputted from the device. The processor is configured to perform monitoring of the device, based on the position data, and control the vehicle, based on a result of the monitoring. The processor is configured to: detect the device that has entered an area less than a predetermined distance from the vehicle, and determine, when the device is moving, a prediction position that is a predicted position of the device after an elapse of a predetermined period of time; restrict, when a detection position of the device based on the position data or the prediction position of the device is in front of the vehicle in the area, forward traveling of the vehicle; and restrict, when the detection position or the prediction position of the device is in rear of the vehicle in the area, rear traveling of the vehicle.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1:
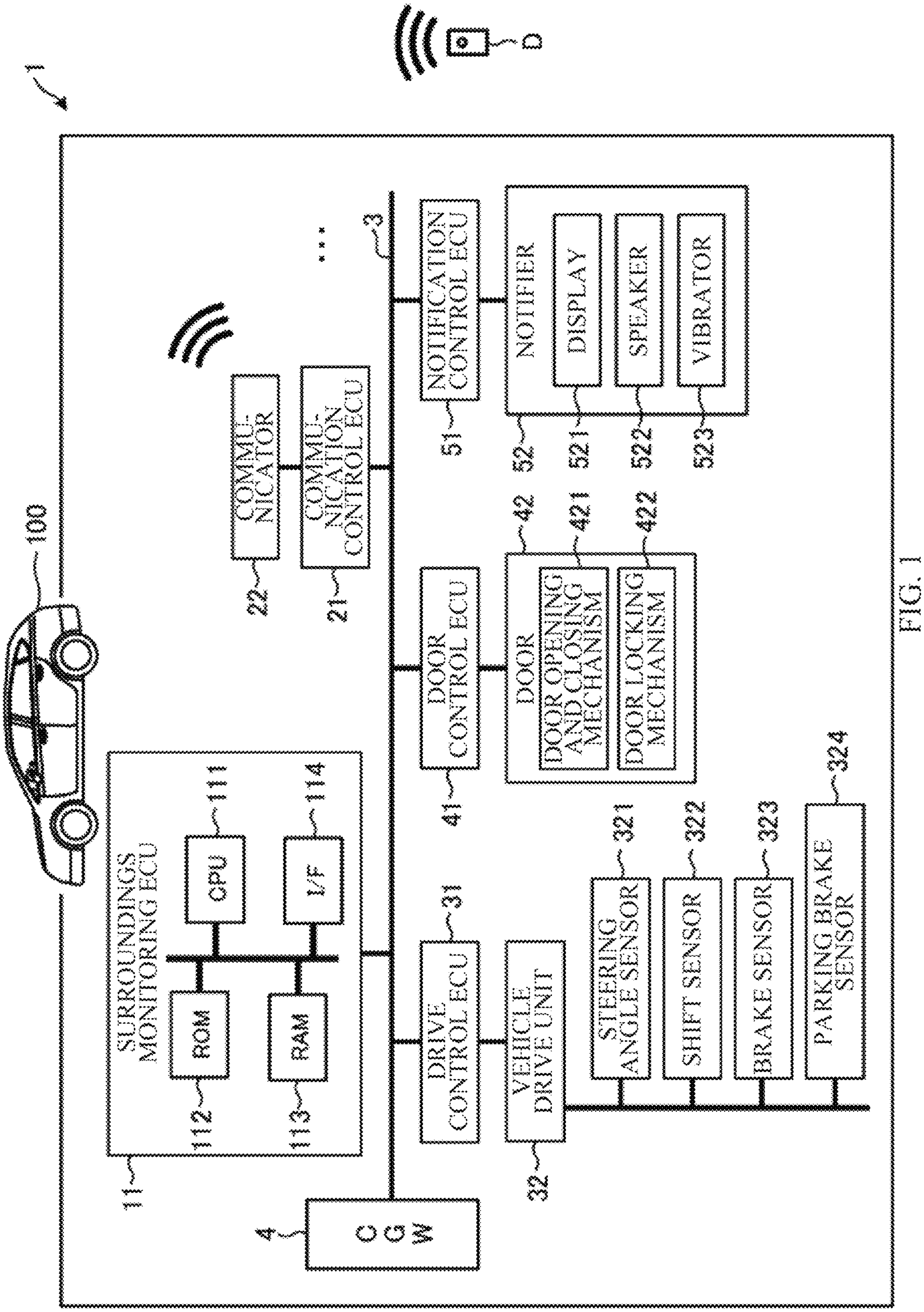
FIG. 1 is an explanatory diagram illustrating a schematic configuration of a vehicle control system that includes a surroundings monitoring apparatus for a vehicle according to one example embodiment of the disclosure.

Various moving objects including not only another vehicle but also a moving object such as a pedestrian or an animal may possibly approach a vehicle from all directions. Accordingly, simply providing information such as displaying an entry prohibition area is sufficient for prevention of a contact with or a collision with all moving objects (hereinafter referred to as a "contact or the like"). In order to prevent the contact or the like with the moving object, an avoidance operation with respect to the moving object may be performed by the vehicle.

However, it is difficult for a driver who drives the vehicle to know a presence or a position of the moving object and to perform the avoidance operation accordingly even if there is a possibility of the contact or the like, when: it is difficult to predict a movement of the moving object; or it is difficult for the driver to visually recognize the moving object due to an example reason that the moving object is positioned at a blind spot of the vehicle.

For example, when an occupant who has got in the vehicle gets out of the vehicle and becomes difficult for the driver to visually recognize the occupant thereafter, the driver can think that "the occupant who got out of the vehicle no longer present in the surroundings of the vehicle" and can resume a driving operation. In this case, the driver can continue the driving operation without performing the avoidance operation, when it is difficult for the driver to visually recognize the occupant due to an example reason that the occupant is positioned at the blind spot of the vehicle even if the occupant who has got out of the vehicle actually presents in the surroundings of the vehicle.

Accordingly, what is desired is to ensure safety of the vehicle and the surroundings of the vehicle by preventing the contact or the like of the vehicle with the moving object by accurately detecting the presence of the moving object and its position, even when the moving object is present at a position where it is difficult for the driver to recognize the moving object, such as the blind spot of the vehicle, in the surroundings of the vehicle.

It is desirable to provide a surroundings monitoring apparatus for a vehicle which makes it possible to ensure safety of the vehicle and the surroundings of the vehicle.

In the following, some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

Referring to FIG. 1, a surroundings monitoring ECU 11 may be configured as a part of a vehicle control system 1 to be mounted on a vehicle 100. In one embodiment, the surroundings monitoring ECU 11 may serve as a "surroundings monitoring apparatus for a vehicle". The vehicle control system 1 may include: a plurality of sensors; various electronic devices necessary for traveling of the vehicle 100; and a plurality of electronic control units (ECUs) that controls the sensors and electronic devices. The sensors may acquire various types of data indicating a traveling state of the vehicle 100 and an environment inside and outside the vehicle 100.

Each sensor, each electronic device, and each ECU may be communicably coupled to each other by an in-vehicle network 3 and a central gateway (CGW) 4. The in-vehicle network 3 may be any network such as a controller area network (CAN) or a local interconnect network (LIN). The CGW 4 may serve as a relay device.

In the vehicle control system 1, data acquired by each sensor may be outputted to the in-vehicle network 3 and data indicating an operation state of an electronic device to be controlled (hereinafter referred to as a "control target device") may be outputted from each ECU to the in-vehicle network 3.

Each ECU may control an operation of the control target device, based on the data from each sensor and another ECU acquired from the in-vehicle network 3.

Each ECU may include a processor such as a central processing unit (CPU) or a micro processing unit (MPU), and execute various processes by the processor. Each ECU may include a volatile storage device such as a random-access memory (RAM) that temporarily processes data to be used by the processor, and a non-volatile storage device such as a read-only memory (ROM) that stores programs to be executed by a device such as the processor. In some embodiments, all or a part of operations to be executed by each ECU may be implemented by hardware such as an application-specific integrated circuit (ASIC), a field-programmable gate array (FPGA), or a graphics processing unit (GPU).

FIG. 1 illustrates the surroundings monitoring ECU 11, a communication control ECU 21, a drive control ECU 31, a door control ECU 41, and a notification control ECU 51 among the plurality of ECUs. The illustration of any other ECU is omitted in FIG. 1. In one embodiment, the surroundings monitoring ECU 11 may serve as the "surroundings monitoring apparatus for the vehicle". FIG. 1 also illustrates: a steering angle sensor 321 that detects a steering angle of an unillustrated steering wheel of the vehicle 100; a shift sensor 322 that detects a position of an unillustrated shift lever; a brake sensor 323 that detects an operation of an unillustrated brake; and a parking brake sensor 324 that detects an operation of an unillustrated parking brake, among the plurality of sensors. In FIG. 1, the illustration of any other sensor and device are omitted.

In the present example embodiment, detailed explanation and illustration of an ECU, a sensor, and an electronic device that are not involved in a configuration and an operation of the surroundings monitoring ECU 11 are omitted even if they are included in the vehicle control system 1.

The description is given now of the surroundings monitoring ECU 11, the communication control ECU 21, the drive control ECU 31, the door control ECU 41, and the notification control ECU 51 illustrated in FIG. 1.

The surroundings monitoring ECU 11 may receive device data emitted from a device D, and monitor the surroundings of the vehicle 100, based on the received device data. For example, the surroundings monitoring ECU 11 may monitor a factor such as a position or a movement of the device D positioned in the surroundings of the vehicle 100, based on the device data emitted from the device D, and may control the vehicle 100, based on a monitoring result. In one example, the surroundings monitoring ECU 11 may output a control signal that controls the vehicle 100, based on the monitoring result.

The device D may be a portable and small communication device able to perform a short-range wireless communication. Non-limiting examples of the short-range wireless communication may include an ultra-wideband wireless communication (UWB), Wi-Fi (registered trademark), and Bluetooth (registered trademark). In some embodiments, the device D may be a dedicated communication device that communicates with the vehicle 100. In some embodiments, the device D may be a general-purpose communication device such as a smartphone or a smartwatch.

The surroundings monitoring ECU 11 may include a CPU 111, a ROM 112, a RAM 113, and an I/F 114 as illustrated in FIG. 1. The surroundings monitoring ECU 11 may monitor the surroundings of the vehicle 100 by causing the CPU 111 to execute various processes that are based on a program stored in the ROM 112.

The ROM 112 may store: a program designed to monitor the device D and control the vehicle 100, based on a monitoring result; and various types of data necessary to execute the program. For example, the ROM 112 may be a non-volatile storage device.

The RAM 113 may be used as a working area when the CPU 111 executes various processes. Accordingly, various types of data outputted from each ECU and each sensor coupled to the in-vehicle network 3 may be temporarily stored in the RAM 113 on an as-necessary basis. The RAM 113 may be a volatile storage device.

The I/F 114 may control an input and an output of various types of data and control signals to be used by the surroundings monitoring ECU 11. For example, the I/F 114 may receive: the device data of the device D received by the communicator 22 and outputted from the communication control ECU 21 to the in-vehicle network 3; and various types of data outputted from any other ECU and various sensors to the in-vehicle network 3. The I/F 114 may output the control signal generated by the CPU 111 to an output destination that corresponds to a control content. In some embodiments, the I/F 114 may be configured to perform a wireless communication, and directly receive the device data emitted from the device D without passing through the in-vehicle network 3.

The CPU 111 may monitor the device D by loading the program stored in the ROM 112 on a memory such as the RAM 113 and executing the program. Further, the CPU 111 may control the vehicle 100, based on a monitoring result.

In one embodiment, the I/F 114 may serve as a "communicator". In one embodiment, the CPU 111 may serve as a "processor".

The communication control ECU 21 may be coupled to the communicator 22, and control transmission and reception of a signal of the communicator 22. The communicator 22 may communicate with the device D, and receive the device data outputted from the device D. The device data may include position data indicating a position of the device D and the identification data of the device D. The communication control ECU 21 may output the device data received by the communicator 22 to the surroundings monitoring ECU 11 via the in-vehicle network 3. In some embodiments, the communicator 22 may be configured to communicate with various devices in addition to or besides the device D. Non-limiting examples of the various devices may include: a communicator mounted on another vehicle; an external server; and an electronic key of the vehicle 100.

The drive control ECU 31 may control a vehicle drive unit 32. For example, the drive control ECU 31 may control driving of an unillustrated system configuring the vehicle drive unit 32, based on a control signal outputted from the drive control ECU 31. Non-limiting examples of the system may include a powertrain system, a brake system, and a steering system. Non-limiting examples of the driving may include steering, acceleration, deceleration, and stopping.

The drive control ECU 31 may receive detection data indicating a detection result by a sensor such as a steering angle sensor 321, a shift sensor 322, a brake sensor 323, and a parking brake sensor 324. The drive control ECU 31 may also receive, from the later-described surroundings monitoring ECU 11, a control signal that is based on the monitoring result of the device D.

The drive control ECU 31 may perform an operation related to traveling, parking, and stopping of the vehicle 100 by controlling the driving of the vehicle drive unit 32, based on: the detection data indicating the detection result of each sensor; and the control signal from the surroundings monitoring ECU 11.

The door control ECU 41 may control a door opening and closing mechanism 421 and a door locking mechanism 422 for each door 42. The door opening and closing mechanism 421 and the door locking mechanism 422 may be provided for each of the doors 42. For example, the door control ECU 41 may lock or unlock the door 42 by controlling the door locking mechanism 422, based on a lock signal or an unlock signal. The lock signal and the unlock signal may be based on an operation performed on a switch provided inside a vehicle compartment. The lock signal and the unlock signal may be a signal received from the electronic key via the communication control ECU 21. The door control ECU 41 may also control the door locking mechanism 422, based on the lock signal or the unlock signal, when the door control ECU 41 receives the lock signal or the unlock signal of the door 42 from the surroundings monitoring ECU 11.

An opening and closing state and a locking and unlocking state of the door 42 may be monitored by an unillustrated door opening and closing sensor and an unillustrated door lock sensor.

The notification control ECU 51 may control a notifier 52 to notify a driver who drives the vehicle 100 of information directed to assist driving of the vehicle 100. Non-limiting examples of the information may include navigation information and a state of the vehicle 100.

The notification control ECU 51 may control, based on the control signal of the surroundings monitoring ECU 11, the notifier 52 to notify the driver of information on the device D, when the device D enters an area that is less than a predetermined distance from the vehicle 100. The area may be referred to as a "warning area WA" as described later.

The information on the device D to be notified to the driver by the notifier may contain information that the driver is to pay attention to the device D. Non-limiting examples of the information on the device D to be notified to the driver may include: information indicating that the device D has approached the vehicle 100: information indicating that the device D is present in the warning area WA; information on a moving direction of the device D; and information on the position of the device D. The notification control ECU 51 may control the notifier 52 to notify the driver of predetermined information among, without limitation, the pieces of information described above. The notifier 52 may include a device such as a display 521, a speaker 522, or a vibrator 523. The notifier 52 may notify the driver of any of various types of information, based on the control by the notification control ECU 51.

Non-limiting examples of the display 521 may include a head-up display (HUD) and a center information display (CID). The position of the device D may be displayed on the display 521 to notify the driver of the position of the device D. Non-limiting examples of the speaker 522 may be a dedicated speaker, a speaker of an unillustrated in-vehicle audio device, and a speaker of an unillustrated navigation system. The speaker 522 may double as the speaker of the in-vehicle audio device or the navigation system. The speaker 522 may notify the driver of the presence of the device D in the surroundings of the vehicle 100 by voice or a warning sound. Non-limiting examples of the vibrator 523 may include: a seat vibrator that vibrates a seat of a driver's seat on which the driver is seated; and a steering vibrator that vibrates the steering wheel. The vibrator 523 may notify the driver of the presence of the device D in the surroundings of the vehicle 100 by its vibration.

Next, the description is given of the monitoring of the device D by the surroundings monitoring ECU 11 and the control of the vehicle 100 based on the monitoring result.

In the vehicle control system 1, the communicator 22 may receive the device data from the device D by communicating with the device D at a predetermined cycle, and output the received device data to the surroundings monitoring ECU 11.

Thus, causing a user to possess the device D makes it possible for the surroundings monitoring ECU 11 to monitor a factor such as a movement or a position of the user by using the device data emitted from the device D. The user may be a target for the surroundings monitoring ECU 11 to grasp whether the user has got on or off the vehicle 100 and to grasp a position of the user before getting on or after getting off of the vehicle 100. For example, this makes it possible for the surroundings monitoring ECU 11 to monitor whether the user who possesses the device D is present in the surroundings of the vehicle 100, and a the position, the movement, or both of the user.

Accordingly, for example, causing a passenger other than the driver to possess the device D when the passenger first gets off in the surroundings of a parking lot upon parking of the vehicle 100 makes it possible to more accurately grasp, for example, whether the passenger has moved away from the vehicle 100 to a location that does not hinder the parking of the vehicle 100.

The surroundings monitoring ECU 11 may detect the presence of the device D and monitor the movement of the device D as follows.

The surroundings monitoring ECU 11 may receive, by the I/F 114, the device data emitted from the device D via the communication control ECU 21 at a fixed cycle, and output the received device data to the CPU 111. The CPU 111 may grasp the position of the device D, based on the device data, and detect the device D that has entered the area less than the predetermined distance from the vehicle 100.

Figure 2:
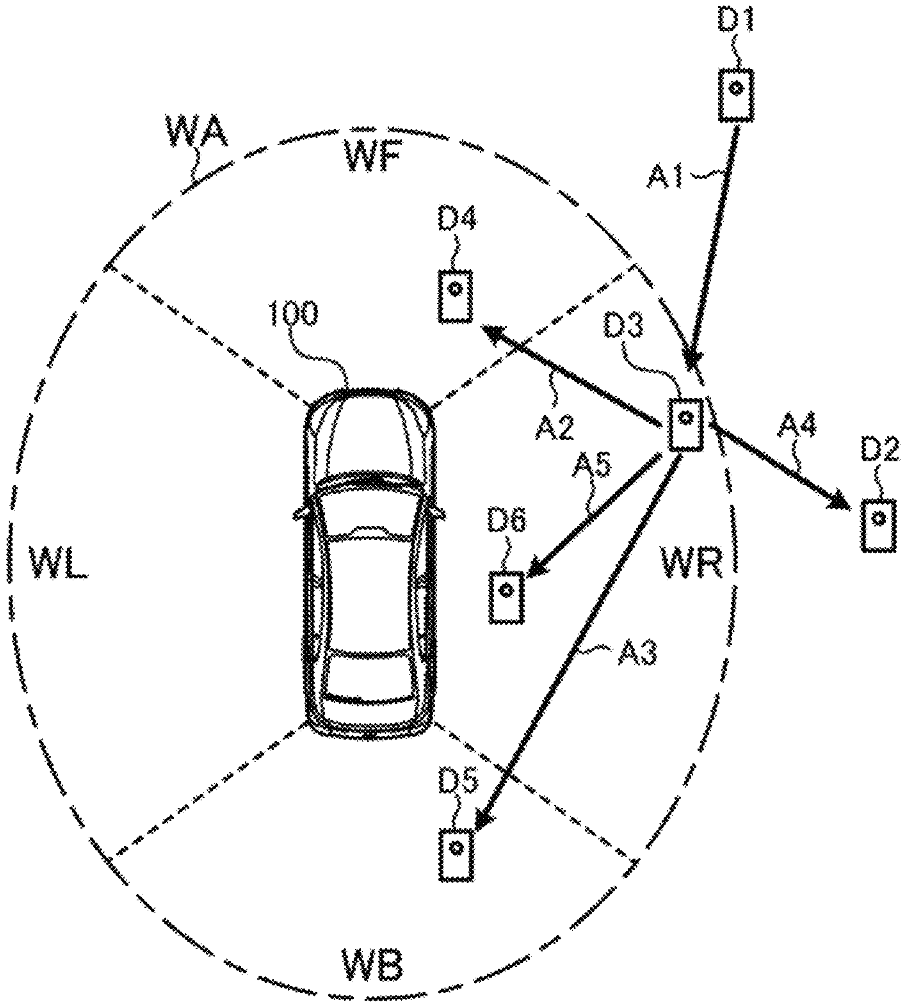
FIG. 2 is an explanatory diagram illustrating an example where a user who possesses a device is present in the surroundings of the vehicle.

In some embodiments, the area less than the predetermined distance from the vehicle 100 may be an area less than a distance of about one meter to several meters from the vehicle 100, and may be an area where a blind spot of the vehicle 100 as viewed from the driver's seat is likely to occur. Such an area makes it difficult for the driver to visually recognize an object such as a person or an obstacle including an animal in the surroundings of the vehicle 100, and may be the area where the driver is to beware in order to ensure safety in the surroundings of the vehicle 100. Hereinafter, the area less than the predetermined distance from the vehicle 100 is referred to as the "warning area WA". When a person or an object such as the animal is present in the warning area WA, the driver is to pay sufficient attention even upon starting from a parked state or a stopped state of the vehicle 100 or upon traveling at an ultra-low speed for the parking or the stopping of the vehicle 100. FIG. 2 illustrates an example of the area less than the predetermined distance from the vehicle 100, i.e., the warning area WA of the vehicle 100 indicated by a dashed-dotted line.

In some embodiments, when the CPU 111 has detected that the device D has entered the warning area WA, the CPU 111 may control the notifier 52 to notify the driver of the vehicle 100 of one or both of: the entry of the device D into the warning area WA; and the a detection position of the device D. For example, the CPU 111 may output data indicating one or both of: the entry of the device D into the warning area WA; and the detection position of the device D. In addition, the CPU 111 may output, to the notification control ECU 51, a control signal directed to the notification to the driver. The notification control ECU 51 may notify, based on the data and the control signal received from the surroundings monitoring ECU 11, the driver that the device D is detected in the warning area WA by using one or more of the display 521, the speaker 522, and the vibrator 523.

Such notification prompts the driver to pay attention and allows the driver to recognize that the device D is present in the warning area WA of the vehicle 100, which in turn allows the driver to brake the vehicle 100, i.e., perform a braking operation, by performing the brake or operating a parking brake. In some embodiments, the CPU 111 may so perform a control as to automatically brake the vehicle 100, when it is determined from the detection result received from the brake sensor 323 or the parking brake sensor 324 that the braking operation by the driver is not performed. The CPU 111 may monitor a state of the device D relative to the vehicle 100 as follows, with the vehicle 100 being braked.

When the CPU 111 detects that the device D has entered the warning area WA, the CPU 111 may calculate a detection position of the device D. The detection position may be indicated by the position data of the device D detected upon the detection. In addition, when the detected device D is moving, the CPU 111 may determine a prediction position of the device D. The prediction position may be a predicted position of the device D after an elapse of a predetermined period of time. The CPU 111 may calculate the prediction position, based on a movement direction and a movement speed of the device D. In some embodiments, the CPU 111 may calculate a movement course of the device D, based on the movement direction and the movement speed of the device D.

The CPU 111 may monitor the position of the device D with respect to the vehicle 100 based on the detection position and control the vehicle 100 based on the monitoring result, when the device D is stopped. The CPU 111 may monitor the position of the device D with respect to the vehicle 100 based on the prediction position and control the vehicle 100 based on the monitoring result, when the device D is moving. For example, the CPU 111 may restrict forward traveling of the vehicle 100, when: the device D is stopped; and the detection position is in the front of the vehicle 100 in the warning area WA. The CPU 111 may restrict backward traveling of the vehicle 100, when: the device D is stopped; and the detection position is in the rear of the vehicle 100 in the warning area WA. The CPU 111 may restrict the forward traveling of the vehicle 100, when: the device D is moving; and the prediction position is in the front of the vehicle 100 in the warning area WA. The CPU 111 may restrict the backward traveling of the vehicle 100, when: the device D is moving; and the prediction position is in the rear of the vehicle 100 in the warning area WA.

In some embodiments, upon restricting the traveling of the vehicle 100, the CPU 111 may predict a traveling direction of the vehicle 100 in the warning area WA, and may restrict, when the detection position or the prediction position of the device D is in the traveling direction of the vehicle 100, the traveling in the traveling direction of the vehicle 100.

For example, the CPU 111 may restrict the forward traveling of the vehicle 100 when: the detection position or the prediction position of the device D is in the front of the vehicle 100 in the warning area WA; and the traveling direction of the vehicle 100 is forward. The CPU 111 may restrict the backward traveling of the vehicle 100 when: the detection position or the prediction position of the device D is in the rear of the vehicle 100 in the warning area WA; and the traveling direction of the vehicle 100 is rearward.

This configuration does not restrict the traveling in the traveling direction of the vehicle 100 when the traveling direction of the vehicle 100 is not the front or the rear, even when the detection position or the prediction position of the device D is in the front of or the rear of the vehicle 100 in the warning area WA. Accordingly, this configuration does not hinder the start of the vehicle and thus helps to achieve both safety and convenience, in an example case where: the user who possesses the device D in the surroundings of the vehicle 100 sends off the start of the vehicle 100 in the surroundings of the vehicle 100; and a position of the user is not in the traveling direction of the vehicle 100.

In some embodiments, the traveling direction of the vehicle 100 may be predicted by determining whether the vehicle 100 is going to move forward or backward, based on, for example, a position of the shift lever detected by the shift sensor 322.

In some embodiments, when the vehicle 100 is in the parked state or the stopped state in response to the braking operation performed by the driver, the traveling direction may be predicted based on the position of the shift lever that is before execution of the braking operation. When the vehicle 100 is in the parked state or the stopped state by being automatically braked in accordance with the CPU 111, the traveling direction may be predicted based on a current position of the shift lever.

In some embodiments, upon predicting the traveling direction of the vehicle 100, the CPU 111 may detect a steering angle of the steering wheel of the vehicle 100 by the steering angle sensor 321 and predict a turning direction of the vehicle 100. In this case, the traveling direction of the vehicle 100 may be predicted or calculated in more detail by performing a predetermined calculation process, based on the position of the shift lever and the steering angle of the steering wheel.

In some embodiments, the CPU 111 may restrict opening of the door 42 of the vehicle 100 that corresponds to the detection position or the prediction position of the device D, when the detection position or the prediction position of the device D is on a side of the vehicle 100 in the warning area WA. For example, the CPU 111 may restrict the opening of the door 42 by outputting, to the door control ECU 41, a control signal designed to restrict the opening of the door 42 that corresponds to the detection position or the prediction position of the device D. The door control ECU 41 may control the door opening and closing mechanism 421 or the door locking mechanism 422 in response to the control signal to thereby restrict the opening of the door 42.

In some embodiments, the opening of the door 42 may be prohibited by disabling, by controlling the door opening and closing mechanism 421, the opening operation performed on the door 42 inside the vehicle compartment of vehicle 100 to thereby restrict the opening of the door 42. In some embodiments, the door 42 may be locked by controlling the door locking mechanism 422 to thereby restrict the opening of the door 42.

An example will now be described with reference to FIG. 2 where a user who possesses the device D is present in the surroundings of the vehicle 100. FIG. 2 illustrates a position of the device D as a position of the user who possesses the device D. FIG. 2 also illustrates, by a dashed-dotted line, the warning area WA as the area less than the predetermined distance from the vehicle 100. For convenience of description, the warning area WA is divided into four partial areas by a broken line. Of the four partial areas, a partial area in the front of the vehicle 100 is referred to as a front warning area WF and a partial region in the rear of the vehicle 100 is referred to as a rear warning area WB. Of the four partial areas, a partial region on a left side of the vehicle 100 is referred to as a left warning area WL and a partial region on a right side of the vehicle 100 is referred to as a right warning area WR.

Referring to FIG. 2, when the device D is outside the warning area WA (D1 and D2), a communication is performed between the device D and the vehicle 100. The surroundings monitoring ECU 11, however, may not perform a notification to the driver regarding the presence of the device D or the position of the device D, and may not restrict braking or driving of the vehicle 100 in response to the presence of the device D.

For example, when the device D (D1) moves along an arrow A1 and enters the right warning area WR, the surroundings monitoring ECU 11 may calculate the detection position (D3), based on the device data of the device D. At this time, when the device D remains at the detection position (D3), the surroundings monitoring ECU 11 may restrict the opening of the door 42 on the right side of the vehicle 100, in response to the detection position (D3) of the device D.

When the device D (D3) continues to move and, for example, moves along an arrow A2, the surroundings monitoring ECU 11 may calculate the prediction position (D4) of the device D, based on the moving direction and the moving speed of the device D (D3). In one example illustrated in FIG. 2, the prediction position (D4) is in the front warning area WF; accordingly, the surroundings monitoring ECU 11 may restrict the forward traveling of the vehicle 100 in response to the prediction position (D4). In some embodiments, at this time, the surroundings monitoring ECU 11 may allow the vehicle 100 to travel backward without restricting the backward traveling when the shift lever of the vehicle 100 is at a reverse position R. In some embodiments, at this time, the surroundings monitoring ECU 11 may not restrict the opening of the door 42.

Similarly, when the device D (D3) moves along an arrow A3, the surroundings monitoring ECU 11 may calculate the prediction position (D5) of the device D, based on the moving direction and the moving speed of the device D (D3). In one example illustrated in FIG. 2, the prediction position (D5) is in the rear warning area WB; accordingly, the surroundings monitoring ECU 11 may restrict the backward traveling of the vehicle 100 in response to the prediction position (D5). In some embodiments, at this time, the surroundings monitoring ECU 11 may allow the vehicle 100 to travel forward without restricting the forward traveling when the shift lever of the vehicle 100 is at a drive position D. In some embodiments, at this time, the surroundings monitoring ECU 11 may not restrict the opening of the door 42.

When the device D (D3) moves along an arrow A5, the surroundings monitoring ECU 11 may calculate the prediction position (D6) of the device D, based on the moving direction and the moving speed of the device D (D3). In this example, the prediction position (D6) is in the same right warning area WR as before the movement of the device D (D3); accordingly, the surroundings monitoring ECU 11 may restrict the opening of the door 42 on the right side of the vehicle 100 which corresponds to the prediction position (D6), in response to the prediction position (D6).

When the device D (D3) moves along an arrow A4 and the calculated prediction position (D2) of the device D is outside the warning area WA, the surroundings monitoring ECU 11 may not perform the notification to the driver regarding the presence of the device D, and may not restrict the traveling of the vehicle 100 in response to the presence of the device D. The surroundings monitoring ECU 11 may not restrict the opening of the door 42.

Figure 3:
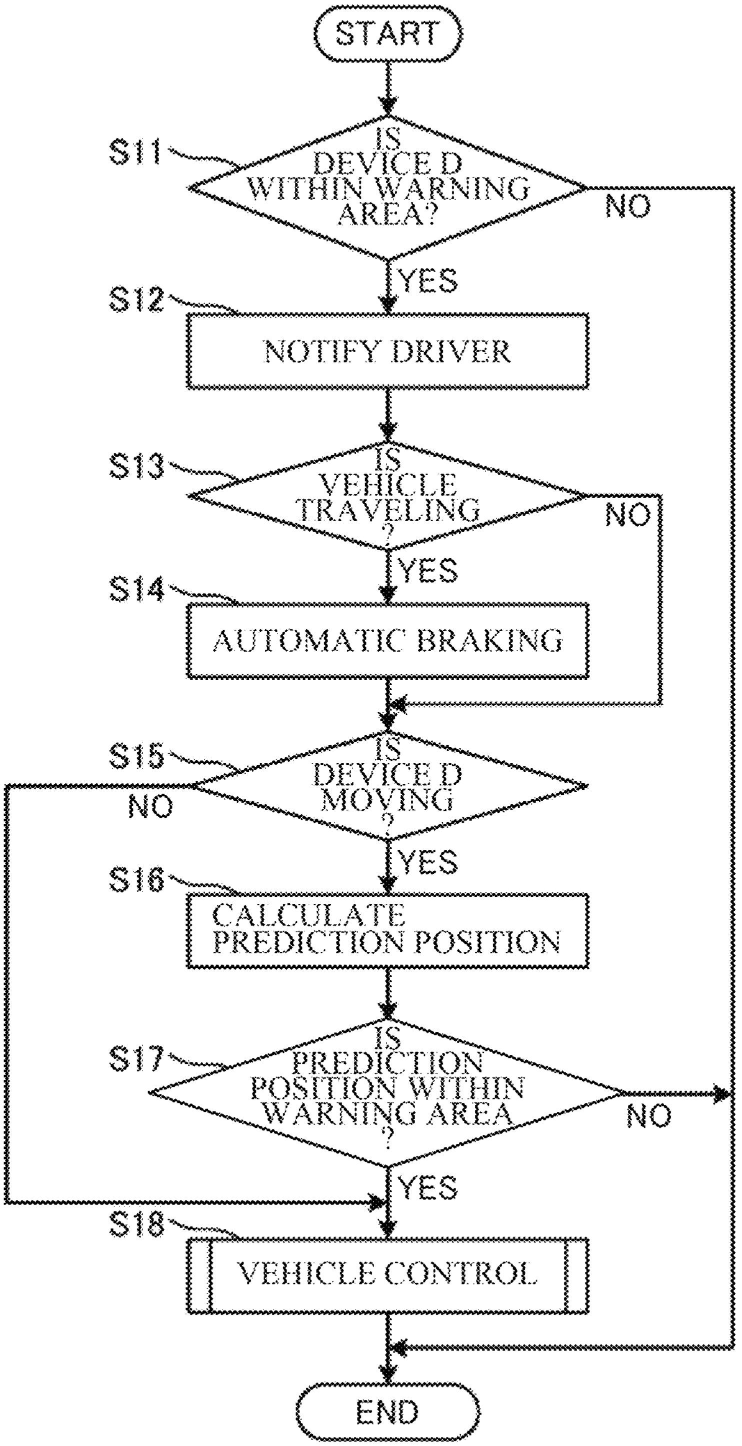
FIG. 3 is a flowchart illustrating a monitoring process of the device to be performed by the surroundings monitoring apparatus illustrated in FIG. 1.
Figure 4:
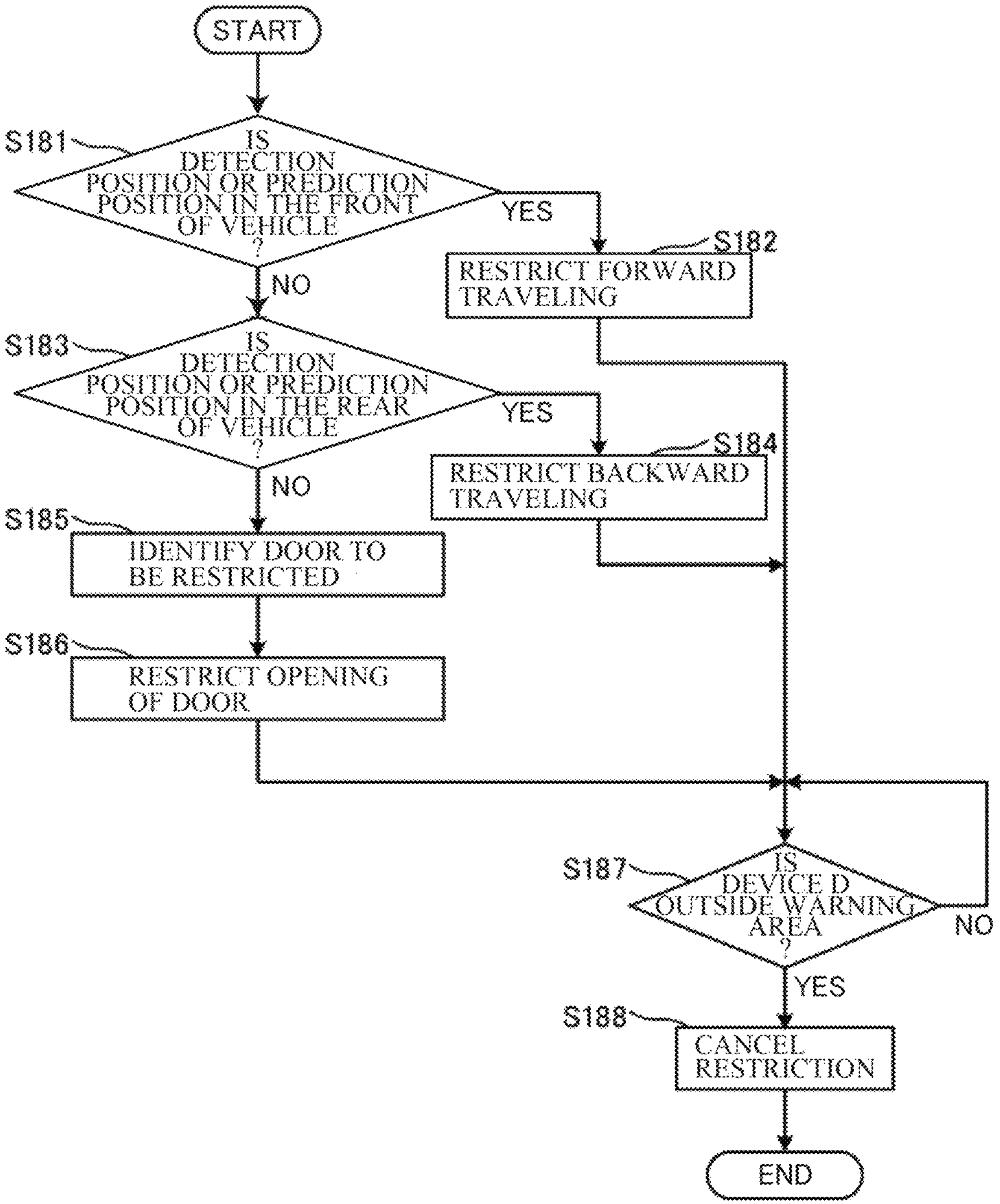
FIG. 4 is a flowchart illustrating a control process which is a vehicle control process of step S18 illustrated in FIG. 3 and which is to be performed on the vehicle based on a monitoring result of the device by the surroundings monitoring apparatus illustrated in FIG. 1.

Hereinafter, a monitoring process of the device D in the surroundings of the vehicle 100 and a control process to be performed based on the monitoring result on the vehicle 100 by the surroundings monitoring ECU 11 configured as described above will be described with reference to flowcharts illustrated in FIGS. 3 and 4. FIG. 3 is a flowchart illustrating an example of the monitoring process of the device D to be performed by the surroundings monitoring ECU 11. FIG. 4 is a flowchart illustrating an example of the control process which is a process of step S18 illustrated in FIG. 3 and which is to be performed on the vehicle 100 based on the monitoring result of the device D.

A series of processes from "START" to "END" in each of the flowcharts illustrated in FIGS. 3 and 4 may be repeatedly performed at a predetermined cycle or a time interval when a monitoring mode for the device D is turned on.

Referring to FIG. 3, the surroundings monitoring ECU 11 may monitor whether the device D is within the warning area WA by acquiring, via the communication control ECU 21, the device data emitted from the device D at the predetermined cycle, when the monitoring mode for the device D is ON (step S11). If the device D has not entered the warning area WA (step S11: NO), the surroundings monitoring ECU 11 may end the process. If the device D enters the warning area WA (step S11: YES), the surroundings monitoring ECU 11 may notify the driver of information about the device D, such as that the device D has entered the warning area WA (step S12).

The surroundings monitoring ECU 11 may confirm whether the vehicle 100 is traveling (step S13). For example, the surroundings monitoring ECU 11 may confirm whether the braking operation is performed on the vehicle 100 by the driver, based on the detection results of the brake sensor 323 and the parking brake sensor 324. If the braking operation to be performed by the driver is not performed (step S13: NO), the surroundings monitoring ECU 11 may cause the process to proceed to step S15. If the braking operation to be performed by the driver is not performed and the vehicle 100 is still traveling (step S13: YES), the vehicle 100 may be automatically braked (step S14).

The surroundings monitoring ECU 11 may monitor whether the device D is moving, based on the device data emitted from the device D (step S15). If the device D is determined as not moving (step S15: NO), the surroundings monitoring ECU 11 may perform the control process of the vehicle 100, based on the detection position of the device D detected when the device D is in the warning area WA (step S18).

If the device D is determined as moving (step S15: YES), the surroundings monitoring ECU 11 may calculate the moving speed and the moving direction of the device D, based on the device data acquired when the device D is detected in the warning area WA and the device data acquired thereafter. The surroundings monitoring ECU 11 may calculate the prediction position of the device D which is after an elapse of a predetermined period of time, based on the moving speed and the moving direction of the device D (step S16). If the prediction position is determined as being within the warning area WA (step S17: YES), the surroundings monitoring ECU 11 may perform the control process of the vehicle 100, based on the prediction position (step S18). If the prediction position is determined as being outside the warning area WA (step S17: NO), the surroundings monitoring ECU 11 may end the process.

Next, the control process of the vehicle 100 to be performed in step S18 of FIG. 3 will be described in detail with reference to the flowchart of FIG. 4.

The surroundings monitoring ECU 11 may perform, based on the detection position of the device D, the control process of the vehicle 100, in accordance with the monitoring result obtained by the monitoring process of the device D illustrated in the flowchart of FIG. 3, when the device D is determined as not moving. When the device D is determined as moving, the surroundings monitoring ECU 11 may perform, based on the prediction position of the device D, the control process of the vehicle 100, in accordance with the monitoring result obtained by the monitoring process of the device D illustrated in the flowchart of FIG. 3.

The surroundings monitoring ECU 11 may confirm the detection position or the prediction position of the device D. If the detection position or the prediction position is in the front of the vehicle 100 (step S181: YES), the surroundings monitoring ECU 11 may restrict the forward traveling of the vehicle 100 (step S182). If the detection position or the prediction position is not in the front of the vehicle 100 (step S181: NO), the surroundings monitoring ECU 11 may confirm whether the detection position or the prediction position is in the rear of the vehicle 100 (step S183). If the detection position or the prediction position is in the rear of the vehicle 100 (step S183: YES), the surroundings monitoring ECU 11 may restrict the backward traveling of the vehicle 100 (step S184). If the detection position or the prediction position is not in the front of or the rear of the vehicle 100 (step S181: NO and step S183: NO), the detection position or the prediction position is assumed to be on a side of the vehicle 100.

Accordingly, the surroundings monitoring ECU 11 may identify, among the plurality of doors 42 of the vehicle 100, the door 42 at a position corresponding to the detection position or the prediction position. In other words, the surroundings monitoring ECU 11 may identify the door 42 to be restricted from being opened (step S185). The surroundings monitoring ECU 11 may restrict the opening of the door 42 thus identified (step S186).

The surroundings monitoring ECU 11 may monitor whether the device D remains in the warning area WA (step S187). If the device D is determined as remaining in the warning area WA, the surroundings monitoring ECU 11 may continue restricting the opening of the door 42 (step S187: NO). If the device D is determined as being away from the warning area WA (step S187: YES), the surroundings monitoring ECU 11 may cancel the restriction of the opening of the door 42 (step S188).

Modification Example

In the present modification example, the vehicle control may be performed in consideration of the traveling direction of the vehicle 100, by adding a process of predicting the traveling direction of the vehicle 100 to the monitoring process of the device D present in the surroundings of the vehicle 100 and the control process of the vehicle 100 that is based on the monitoring result (FIGS. 3 and 4).

Figure 5:
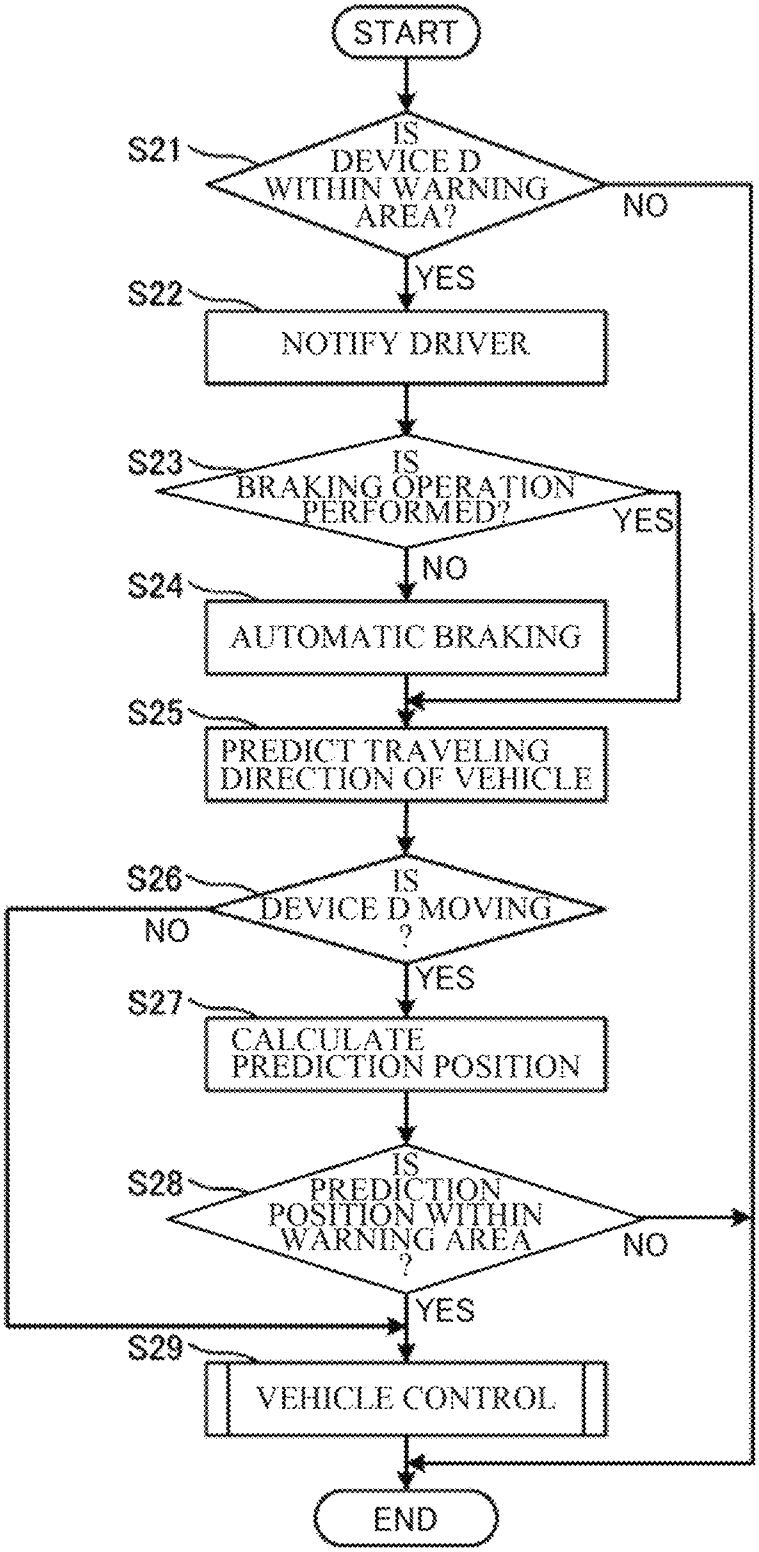
FIG. 5 is a flowchart illustrating a modification example of the monitoring process of the device to be performed by the surroundings monitoring apparatus illustrated in FIG. 1.
Figure 6:
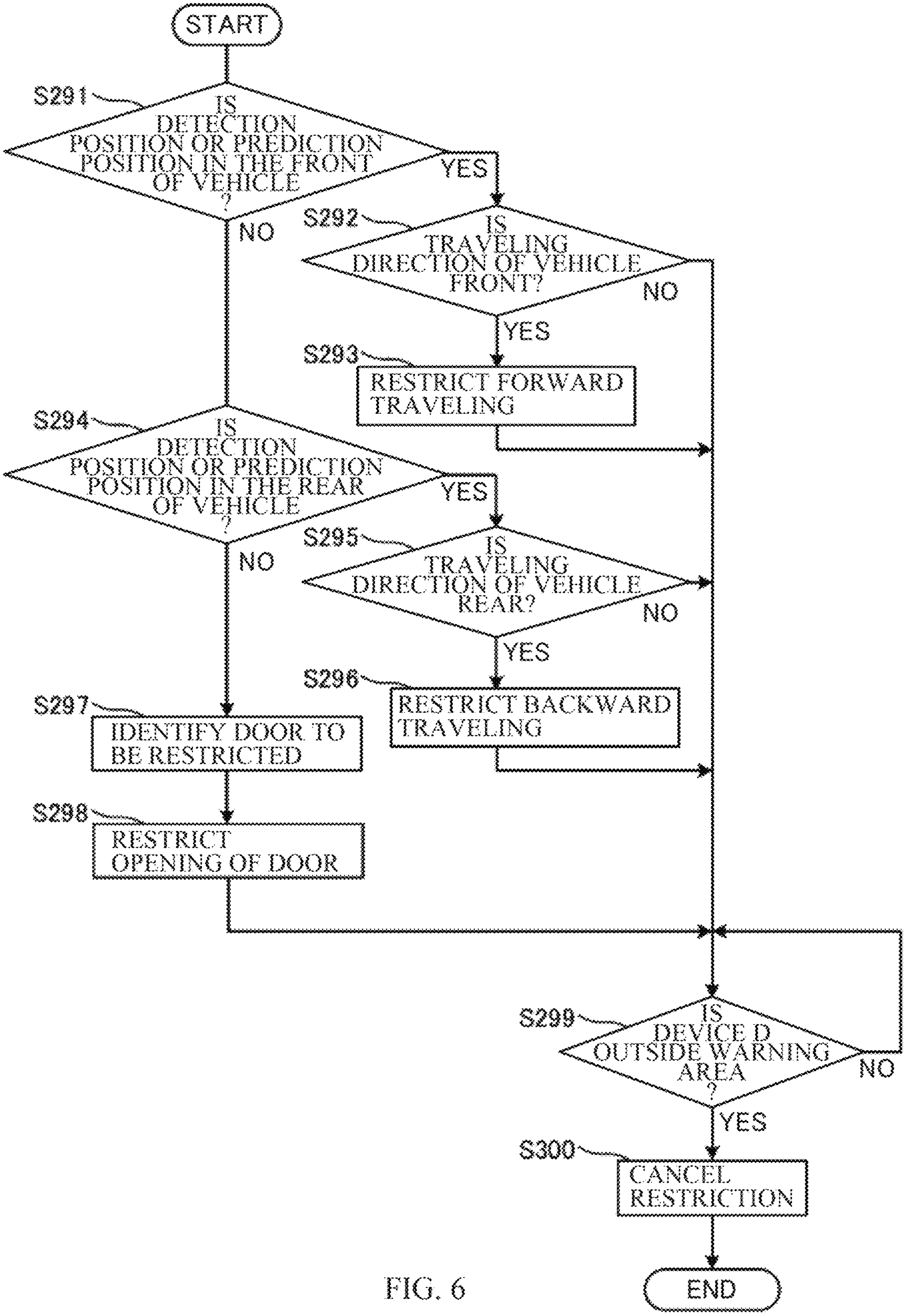
FIG. 6 is a flowchart illustrating a modification example of the control process which is a vehicle control process of step S29 illustrated in FIG. 5 and which is to be performed on the vehicle based on a monitoring result of the device by the surroundings monitoring apparatus illustrated in FIG. 1.

Hereinafter, the monitoring process of the device D in the surroundings of the vehicle 100 and the control process to be performed based on the monitoring result on the vehicle 100 according to one modification example will be described with reference to flowcharts illustrated in FIGS. 5 and 6. FIG. 5 is a flowchart illustrating an example of the monitoring process of the device D to be performed by the surroundings monitoring ECU 11. FIG. 6 is a flowchart illustrating an example of the control process which is a process of step S29 illustrated in FIG. 5 and which is to be performed on the vehicle 100 based on the monitoring result of the device D. In the present modification example, the description of processes overlapping with the respective processes in FIGS. 3 and 4 will be simplified or omitted.

Referring to FIG. 5, the surroundings monitoring ECU 11 may monitor whether the device D is within the warning area WA, based on the device data emitted from the device D, when the monitoring mode for the device D is ON (step S21). If the surroundings monitoring ECU 11 detects that the device D is present in the warning area WA (step S21: YES), the surroundings monitoring ECU 11 may notify the driver that the device D is present in the warning area WA (step S22).

The surroundings monitoring ECU 11 may confirm whether the braking operation is performed on the vehicle 100 by the driver, based on the detection results of the brake sensor 323 and the parking brake sensor 324 (step S23). If the braking operation to be performed by the driver is not performed and the vehicle 100 is still traveling (step S23: NO), the vehicle 100 may be automatically braked (step S24).

The surroundings monitoring ECU 11 may predict the traveling direction of the vehicle 100, based on the detection result of the shift sensor 322, with the vehicle 100 being braked (step S25). The surroundings monitoring ECU 11 may monitor whether the device D is moving, based on the device data of the device D (step S26). If the device D is determined as not moving (step S26: NO), the surroundings monitoring ECU 11 may perform the control process of the vehicle 100, based on the detection position of the device D detected when the device D is in the warning area WA (step S29).

If the device D is determined as moving (step S26: YES), the surroundings monitoring ECU 11 may calculate the prediction position of the device D which is after an elapse of a predetermined period of time, based on the moving speed and the moving direction of the device D (step S27). If the prediction position is determined as being within the warning area WA (step S28: YES), the surroundings monitoring ECU 11 may perform the control process of the vehicle 100, based on the prediction position (step S29). If the prediction position is determined as being outside the warning area WA (step S28: NO), the surroundings monitoring ECU 11 may end the process.

Next, the control process of the vehicle 100 to be performed in step S29 of FIG. 5 will be described in detail with reference to the flowchart of FIG. 6.

The surroundings monitoring ECU 11 may perform, based on the detection position of the device D, the control process of the vehicle 100, in accordance with the monitoring result obtained by the monitoring process of the device D illustrated in the flowchart of FIG. 5, when the device D is determined as not moving. When the device D is determined as moving, the surroundings monitoring ECU 11 may perform, based on the prediction position of the device D, the control process of the vehicle 100, in accordance with the monitoring result obtained by the monitoring process of the device D illustrated in the flowchart of FIG. 5.

The surroundings monitoring ECU 11 may confirm the detection position or the prediction position of the device D. If the detection position or the prediction position is in the front of the vehicle 100 (step S291: YES) and the traveling direction of the vehicle 100 is the front (step S292: YES), the surroundings monitoring ECU 11 may restrict the forward traveling of the vehicle 100 (step S293).

If the detection position or the prediction position is in the rear of the vehicle 100 (step S291: NO and step S294: YES) and the traveling direction of the vehicle 100 is the rear (step S295: YES), the surroundings monitoring ECU 11 may restrict the backward traveling of the vehicle 100 (step S293).

If the detection position or the prediction position is not in the front of or the rear of the vehicle 100 (step S291: NO and step S294: NO), the detection position or the prediction position is assumed to be on a side of the vehicle 100. Accordingly, the surroundings monitoring ECU 11 may identify, among the plurality of doors 42 of the vehicle 100, the door 42 at a position corresponding to the detection position or the prediction position. In other words, the surroundings monitoring ECU 11 may identify the door 42 to be restricted from being opened (step S297). The surroundings monitoring ECU 11 may restrict the opening of the door 42 thus identified (step S298).

The surroundings monitoring ECU 11 may monitor whether the device D remains in the warning area WA (step S299). If the device D is determined as remaining in the warning area WA, the surroundings monitoring ECU 11 may continue restricting the opening of the door 42 (step S299: NO). If the device D is determined as being away from the warning area WA (step S299: YES), the surroundings monitoring ECU 11 may cancel the restriction of the opening of the door 42 (step S300).

According to the example embodiment and the modification example, the position of the device D with respect to the vehicle 100 is more accurately grasped, and the vehicle 100 is restricted from traveling forward when the device D is positioned in front of the vehicle 100 or from traveling backward when the device D is positioned in the rear of the vehicle 100. Thus, this configuration helps to control the vehicle 100 in accordance with the position of the device D even when the device D is present at the blind spot of the vehicle 100. Accordingly, causing a particular user, whose position, the movement, or both in the surroundings of the vehicle 100 is to be monitored, to possess the device D configured to communicate with the vehicle 100 helps to more accurately grasp the presence, the position, or both of the moving object in the surroundings of the vehicle 100, based on the data emitted from the device D, and to secure the safety of the vehicle 100 and the surroundings of the vehicle 100.

Although some example embodiments of the disclosure have been described in the foregoing by way of example with reference to the accompanying drawings, the disclosure is by no means limited to the embodiments described above. It should be appreciated that modifications and alterations may be made by persons skilled in the art without departing from the scope as defined by the appended claims. The disclosure is intended to include such modifications and alterations in so far as they fall within the scope of the appended claims or the equivalents thereof. The techniques according to the example embodiments and their modification examples described above may be combined with each other in any combination unless any contradiction occurs in terms of their purposes, configurations, etc.

The limitations in the claims are to be interpreted broadly based on the language employed in the claims and not limited to examples described in this specification or during the prosecution of the application, and the examples are to be construed as non-exclusive.

As used in this specification and the appended claims, the singular forms “a,” “an,” and “the” include, especially in the context of the claims, are to be construed to cover both the singular and the plural, unless otherwise indicated herein or clearly contradicted by context.

Throughout this specification and the appended claims, unless the context requires otherwise, the terms “comprise”, “include”, “have”, and their variations are to be construed to cover the inclusion of a stated element, integer, or step but not the exclusion of any other non-stated element, integer, or step.

The use of the terms first, second, etc. do not denote any order or importance, but rather the terms first, second, etc. are used to distinguish one element from another.

The term “substantially”, “approximately”, “about”, and its variants having the similar meaning thereto are defined as being largely but not necessarily wholly what is specified as understood by one of ordinary skill in the art.

The term “disposed on/provided on/formed on” and its variants having the similar meaning thereto as used herein refer to elements disposed directly in contact with each other or indirectly by having intervening structures therebetween.

The CPU 111 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the CPU 111. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the surroundings monitoring CPU 111 illustrated in FIG. 1.

The invention claimed is:

1. A surroundings monitoring apparatus for a vehicle, the surroundings monitoring apparatus being configured to monitor surroundings of the vehicle, based on data acquired from a device that is portable and that is configured to communicate with the vehicle, the surroundings monitoring apparatus comprising:

a communicator configured to receive position data of the device output from the device; and a processor configured to determine a position of the device with respect to the vehicle based on the position data and control the vehicle based on the position of the device with respect to the vehicle, wherein the processor is configured to:

detect, based on the position data, that the device has entered a warning area within a predetermined distance from the vehicle, and determine a detection position of the device based on the position data, wherein the warning area includes a front warning area in front of the vehicle, a rear warning area in rear of the vehicle, and side warning areas on sides of the vehicle;

determine, based on the position data, whether the device is moving;

calculate, when the device is moving, a prediction position of the device after an elapse of a predetermined period of time based on a moving direction and a moving speed of the device;

restrict, when the device is moving and the prediction position is in the front warning area, forward traveling of the vehicle; and restrict, when the device is moving and the prediction position is in the rear warning area, backward traveling of the vehicle.

2. The surroundings monitoring apparatus according to claim 1, wherein the processor is configured to, when the processor detects that the device has entered the warning area, control a notifier provided in the vehicle to notify an occupant of the vehicle of the entry of the device into the warning area, the detection position, or both.

3. The surroundings monitoring apparatus according to claim 1, wherein the processor is configured to, when the detection position or the prediction position of the device is in one of the side warning areas, restrict opening of a door of the vehicle that corresponds to the detection position or the prediction position.

4. The surroundings monitoring apparatus according to claim 3, wherein the processor is configured to, when an opening operation for the door is performed from inside a vehicle compartment of the vehicle, disable the opening operation and temporarily prohibit opening of the door.

5. The surroundings monitoring apparatus according to claim 1, wherein the processor is configured to, when the processor detects that the device has entered the warning area, automatically brake the vehicle.

6. The surroundings monitoring apparatus according to claim 3, wherein the processor is configured to:

continue restricting opening of the door while the device remains in the one of the side warning areas; and cancel the restriction on opening of the door when the device moves away from the one of the side warning areas.

7. The surroundings monitoring apparatus according to claim 1, wherein when the device is moving and the detection position is in one of the side warning areas, the processor is configured to:

restrict forward traveling of the vehicle when the prediction position is in the front warning area; and restrict backward traveling of the vehicle when the prediction position is in the rear warning area.

* * * * *